Patented Jan. 1, 1952

2,580,565

UNITED STATES PATENT OFFICE 2,580,565

RETARDED CEMENT

Norman C. Ludwig, Chicago, Ill., assignor to Universal Atlas Cement Company, a corporation of Indiana No Drawing. Application April 25, 1946, Serial No. 664,984

2 Claims. (Cl. 106—93)

This invention relates to cements having retarded rates of hydration or set, to slurries of such cement, and to the method of making these slurries. The cement with which the invention is concerned is a Portland or Portland-type cement.

Among the objects of the invention is the provision of a cement having a retarded rate of hydration, or a retarded set as it will be hereinafter termed, particularly at elevated temperatures such as are encountered in the cementing of deep walls.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within about 24 hours.

It has been found that Portland and Portland-type cement slurries can be retarded so that they meet all the above requirements for the satisfactory cementing of deep wells and like operations by the addition of hydroxyethylcellulose (HEC) within certain definite limits. More specifically, the cement and slurry of the present invention contain hydroxyethylcellulose within the range of from .05 to .60% by weight of the dry cement. Ordinarily, it is preferred to use hydroxyethylcellulose within the range of from .05 to .50% by weight of the dry cement. It has been found that when used in the above indicated amounts, hydroxyethylcellulose acts as a retarder at temperatures from room temperature to 220° F., being most effective in the temperature range of from 140° to 180° F.

Hydroxyethylcellulose, which is sold commercially in powder form and also as an aqueous solution, is a hydroxyalkyl ether of cellulose. Hydroxyethylcellulose is sometimes also termed "glycol cellulose." It may be made by the reaction of ethylene oxide with alkali cellulose, the reaction apparently being one of addition and the product, hydroxyethylcellulose, being representable by the formula:

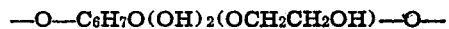

Hydroxyethylcellulose is soluble in water and acetic acid, but is insoluble in acetone and ether. Depending upon the base material and the treatment, hydroxyethylcellulose may be made with different physical properties; these are classified in the trade on the basis of the viscosity of the aqueous solution. It is ordinarily preferred to employ hydroxyethylcellulose in this invention which is readily soluble in water and which has a relatively low viscosity. It is to be understood, however, that within the teaching of the invention all water-soluble hydroxyethylceluloses may be employed.

The cement employed may be any Portland or Portland-type hydraulic cement, the particular type used depending upon the particular application to be made of the cement or of the slurry, and of the properties demanded by such application, such as setting time, strength of the set slurry, and so forth. In making the test specimens of cements within the invention, the results of tests on which are set forth below, cements of both the A. S. T. M. Type I and Type II, Portland type, were employed as indicated. The oxide composition of such cements and the specific surface as determined by the Wagner turbidimetric method are given below:

Oxide composition—percent

| Cement | SiO$_2$ | Al$_2$O$_3$ | Fe$_2$O$_3$ | CaO | MgO | MnO | SO$_3$ | Loss on Ignition | Specific Surface, Wagner, sq. cm./g. |
|---|---|---|---|---|---|---|---|---|---|
| Type II | 22.1 | 4.8 | 4.3 | 64.2 | 0.88 | 0.20 | 1.70 | 1.20 | 1,175 |
| Type I  | 21.8 | 6.0 | 2.5 | 65.0 | 1.1  | 0.16 | 1.70 | 1.20 | 1,800 |

In the tests of cements in accordance with the invention neat slurries containing the indicated type of cement, water, and the indicated additive were made up, there being used in each case 100 parts by weight of the cement and 40 parts by weight of water. This gave a slurry which was typical of those employed in oil well cementing operations. The tests included the determination of the stiffening time of slurries at temperatures of 140°, 180°, 200°, and 220° F., the determination of the consistency of the slurries at intervals after their mixing, and the determination of compressive strengths of the set and cured cement structure resulting from such slurries.

The stiffening times and the consistencies of the slurries at temperatures of 140°, 180°, and 200° F. were determined by use of an apparatus such as shown in Weiler Patent No. 2,122,765, dated July 5, 1938, which is known as the "Halliburton Consistometer," and is designed to test stirring or pumpability time of cement slurries at high temperatures. Such device consists essentially of a rotating cylindrical container with an internal paddle assembly fixed to a head whose movement is independent of the container. With the container filled with cement slurry, the force against the paddle due to rotation of the container and the viscosity of the slurry is transferred from the head of the apparatus to a pendulum lever arm by a suitable connection. The pendulum range is graduated from 0 to 10 divisions, representing slurry viscosities of 0 to 100 poises, a pull of 10 divisions on the pendulum is considered to represent the limit of pumpability of the slurry in an oil well. The temperature of the slurry during the test was maintained at the degree indicated by a thermostatically controlled bath surrounding the container. In the following tables stiffening time was taken as the time from initiation of the test in the consistometer until the indicator on the pendulum showed a slurry viscosity of 100 poises.

The determination of the stiffening time of slurries at a temperature of 220° F. was carried out by use of a pressure consistometer such as described in Technical Publication No. 1207 of the American Institute of Mining and Metallurgical Engineers. Such tests were conducted under pressure small enough so that they had little effect on the stiffening times and were sufficient only to prohibit evaporation of water from the slurry at the constant temperature of 220° F., which, of course, is above the boiling point of water. In such pressure consistometer the cell which contains the slurry is placed in a heated pressure cylinder and petroleum oil is pumped into the cylinder entirely surrounding the cell. At 220° F. it was necessary to subject the slurry to but from two to five pounds per square inch by means of the oil acting through the medium of the synthetic rubber diaphragm interpose between the slurry and the oil. The apparatus works on the same principle as does the Halliburton Consistometer, but the standard method for operation of the pressure consistometer, which method was employed in the present tests, specifies a shearing rate of 47 R. P. M. and viscosity of 80 "poises" for termination of the test, such shearing rate being about twice that employed in the Halliburton Consistometer which as above pointed out, employs a viscosity of 100 poises for termination of the tests therein. At temperatures of 200° F. and lower, final stiffening times on the same slurries in the Halliburton Consistometer and the pressure consistometer check very closely.

The compressive strengths reported in the tables below were determined by making two-inch cubes which were molded from portions of the various cement slurries. When the molds were filled they were covered with metal plates and placed in the water of temperature baths operating at 140° and 200° F., as indicated. At approximately 20 hours the specimens were removed from the molds and returned to the temperature baths. Three cubes of each slurry were broken at 24 hours and three were broken at three days by subjecting them to compression to destruction in a standard compression testing machine.

Hydroxyethylcellulose can be added to the dry cement in powder form and intermixed therewith before the addition of water to form the slurry, or it can be added to the cement slurry in aqueous solutions. The more practical method, from a commercial standpoint, is to add the material to the dry cement, and it was this method which was employed in making the tests. In cement slurries, especially when the slurries are mixed rapidly and consequently with high agitation, hydroxyethylcellulose acts as a foam stabilizing agent and causes the entrainment of a considerable amount of air. In the usual methods of preparing slurries for use in oil wells therefore, the addition of hydroxyethylcellulose may cause foaming and frothing of the slurry which is generally considered undesirable in oil well cementing operations. Such foaming and frothing of the slurry containing hydroxyethylcellulose can be nullified by the use of defoaming agents such as tributyl phosphate and pine oil. Such defoaming agents when used, are added in small amounts, from .02 to .05% tributyl phosphate being typical, sufficient to suppress the foaming and frothing tendencies of hydroxyethylcellulose on the slurry under the particular slurry mixing and pumping conditions employed. In each of the slurries tested which contained hydroxyethylcellulose, 0.02% tributyl phosphate was added.

TABLE I

*Stiffening time at constant temperature*

| Cement | Additive—per cent | Stiffening Times at Temperatures Indicated— | | | | | | | |
|---|---|---|---|---|---|---|---|---|---|
| | | 140° F. | | 180° F. | | 200° F. | | 220° F. | |
| | | Hr. | Min. | Hr. | Min. | Hr. | Min. | Hr. | Min. |
| 1. Type II | None | 3 | 46 | 1 | 47 | 1 | 29 | 1 | 11 |
| 2. Type II | HEC 0.25 | 14 | 32 | 8 | 54 | 5 | 37 | 2 | 46 |
| 3. Type I | None | 2 | 9 | 1 | 12 | 0 | 42 | 0 | 32 |
| 4. Type I | HEC 0.60 | 19 | 45 | 13 | 15 | 4 | 56 | 1 | 51 |

The stiffening time results given in Table I show that hydroxyethylcellulose is a considerably more effective retarder at temperatures of 140° and 180° F. than at temperatures of 200° and 220° F. For some purposes the long stiffening times of slurries 2 and 4 at temperatures of 140° and 180° F. would be disadvantageous. Consequently, when the slurry is to be used at such lower temperatures, it is necessary to use smaller amounts of hydroxyethylcellulose if the stiffening time is not to be unduly prolonged.

TABLE II
*Stiffening time at 140° F.*

| Cement | Additive—per cent | Stiffening Time at 140° F. | |
|---|---|---|---|
| | | Hr. | Min. |
| 1. Type II | 0.15 HEC | 7 | 10 |
| 2. Type II | 0.05 HEC | 3 | 14 |

As pointed out above, it is desirable in oil well cementing and like operations that the slurry remain easily pumpable over extended periods of time, even though it is subjected to high temperatures. The following Table III gives the results of slurry consistency tests run in the Halliburton Consistometer at a temperature of 200° F.

TABLE III
*Slurry consistency at 200° F.*

| Cement | Additive—per cent | Consistency in "Poises" at Times Indicated— | | | | | | Stiffening Time | |
|---|---|---|---|---|---|---|---|---|---|
| | | 15 min. | 30 min. | 1 hr. | 2 hr. | 3 hr. | 4 hr. | Hr. | Min. |
| 1. Type II | None | 14 | 19 | 20 | | | | 1 | 29 |
| 2. Type II | HEC 0.25 | 15 | 20 | 19 | 18 | 18 | 16 | 5 | 37 |
| 3. Type I | None | 20 | 33 | | | | | 0 | 42 |
| 4. Type I | HEC 0.60 | 17 | 28 | 12 | 12 | 14 | 18 | 4 | 56 |

It may be seen from the above table that slurries 1 and 3 made with Type II and Type I cement, respectively, with no hydroxyethylcellulose added, hydrated at such rates that slurry 1 had stiffened sufficiently so that it had a consistency of 100 poises at 1 hour and 29 minutes, and that slurry 3 had stiffened sufficiently so that it had a consistency of 100 poises at 42 minutes, thus showing that they were unfit for the cementing operations contemplated at 200° F. With both slurries 2 and 4, however, a consistency far below 100 poises was maintained throughout the entire period from the time of mixing to four hours after mixing, showing that such slurries remained pumpable for times which were adequate for cementing even the deepest wells.

The presence of hydroxyethylcellulose in the slurries in amounts taught by the invention does not in the main adversely affect the strength of the cured cement structure resulting from the slurry, and in most instances, increases such strength both in structures cured at 140° F. and those cured at 200° F., over those resulting from similar slurries not containing hydroxyethylcellulose. The compressive strengths given in Table IV are the average values for three two-inch cubes cured and tested as set out above.

TABLE IV
*Compressive strengths when cured at 140° and 200° F.*

| Cement | Additive—per cent | Comp. Stg. at Curing Temperature and Age Indicated—p. s. i. | | | |
|---|---|---|---|---|---|
| | | 140° F. | | 200° F. | |
| | | 24 hr. | 3 day | 24 hr. | 3 day |
| 1. Type II | None | 2,737 | 4,860 | 4,268 | 4,625 |
| 2. Type II | HEC 0.25 | 2,480 | 5,950 | 4,442 | 5,893 |
| 3. Type I | None | 4,093 | 5,780 | 3,063 | 3,327 |
| 4. Type I | HEC 0.60 | 1,156 | 5,877 | 3,765 | 4,653 |

Whereas I have disclosed preferred compositions of the cement, cement slurries, and methods of making them, it is to be understood that the invention is capable of considerable variation as to details. I, therefore, claim as new the following:

1. A cement capable of forming a fluid slurry when mixed with water, said cement having a retarded set at temperatures above atmospheric, said cement consisting of a hydraulic cement mixed with from .05 to .60% water soluble hydroxyethylcellulose by weight of the dry cement.

2. A cement capable of forming a fluid slurry when mixed with water, said cement having a retarded set at temperatures above atmospheric, said cement consisting of a hydraulic cement mixed with from .05 to .60% water soluble hydroxyethylcellulose by weight of the dry cement and a defoaming agent.

NORMAN C. LUDWIG.

REFERENCES CITED

The following references are of record in the file of this patent:

UNITED STATES PATENTS

| Number | Name | Date |
|---|---|---|
| 2,089,752 | Lang | Aug. 10, 1937 |
| 2,328,290 | Neiderreither | Aug. 31, 1943 |
| 2,398,047 | Schmidt | Apr. 9, 1946 |
| 2,427,683 | Ludwig | Sept. 23, 1947 |
| 2,432,971 | Ruthman | Dec. 16, 1947 |
| 2,476,306 | King | July 19, 1949 |